(12) United States Patent
Keeni

(10) Patent No.: US 7,966,392 B2
(45) Date of Patent: Jun. 21, 2011

(54) NETWORK MANAGEMENT SYSTEM AND NETWORK MANAGEMENT INFORMATION COLLECTING METHOD

(75) Inventor: Glenn Mansfield Keeni, Miyagi (JP)

(73) Assignee: Cyber Solutions Inc., Miyagi (JP)

( * ) Notice: Subject to any disclaimer, the term of this patent is extended or adjusted under 35 U.S.C. 154(b) by 701 days.

(21) Appl. No.: 11/997,191

(22) PCT Filed: Jul. 28, 2006

(86) PCT No.: PCT/JP2006/314964
§ 371 (c)(1),
(2), (4) Date: Jan. 29, 2008

(87) PCT Pub. No.: WO2007/013583
PCT Pub. Date: Feb. 1, 2007

(65) Prior Publication Data
US 2010/0049781 A1 Feb. 25, 2010

(30) Foreign Application Priority Data
Jul. 29, 2005 (JP) .................................. 2005-222146

(51) Int. Cl.
G06F 15/173 (2006.01)
(52) U.S. Cl. .......................... 709/223; 709/224; 709/225
(58) Field of Classification Search ........... 709/223–225
See application file for complete search history.

(56) References Cited

U.S. PATENT DOCUMENTS

| | | | | |
|---|---|---|---|---|
| 5,623,643 A * | 4/1997 | Janssen et al. | ................... | 703/27 |
| 6,006,016 A * | 12/1999 | Faigon et al. | ................... | 714/48 |
| 7,137,039 B2 * | 11/2006 | Durrant et al. | ................... | 714/47 |
| 7,165,192 B1 * | 1/2007 | Cadieux et al. | ................. | 714/43 |
| 7,284,140 B2 * | 10/2007 | Suzuki et al. | ................. | 713/340 |
| 7,301,909 B2 * | 11/2007 | Langevin et al. | ............. | 370/242 |
| 7,337,353 B2 * | 2/2008 | Yamamoto et al. | ............... | 714/7 |
| 7,516,025 B1 * | 4/2009 | Williams et al. | ................ | 702/57 |
| 7,519,703 B1 * | 4/2009 | Stuart et al. | ................... | 709/224 |
| 7,558,192 B1 * | 7/2009 | Truong et al. | ................. | 370/216 |

FOREIGN PATENT DOCUMENTS

| | | |
|---|---|---|
| JP | 2001282646 | 10/2001 |
| JP | 2003-30061 | 1/2003 |

OTHER PUBLICATIONS

"MobiSNMP : SNMP over Mobile IPv6", Hajima Kitagawa et al., IEICE Technical Report, vol. 105, No. 80, May 18, 2005, pp. 81-86.
International Search Report dated Oct. 17, 2006.

* cited by examiner

Primary Examiner — Hussein A Elchanti
(74) Attorney, Agent, or Firm — Young & Thompson

(57) ABSTRACT

This invention aims to provide a technique that, in wireless network environments, enables the Manager to collect network management information (MIB data in the case of SNMP based network management), which the Agent has stored during periods of disconnection, after connectivity to the mobile nodes has recovered. In a wireless network environment, the Agent (201) has a unit for storing the management information related to network devices with appropriate label information, while the Manager (101) has a unit for sending the Agent a request for a label-specified data, and getting the data which the Agent has stored in Management Information Store 207. The above unit enables the Manager (101) to seamlessly collect the information pertaining to the period of disconnection, which the Agent (201) has stored in Management Information Store 207, after detecting recovery of the connectivity.

9 Claims, 5 Drawing Sheets

NETWORK MANAGEMENT SYSTEM AND NETWORK MANAGEMENT INFORMATION COLLECTING METHOD

TECHNICAL FIELD

This invention presents a method by which a network manager can collect network management information from agents for network management in a wireless network environment using a network management protocol, such as SNMP (Simple Network Management Protocol).

BACKGROUND TECHNOLOGY

In recent years, the Internet has grown rapidly. Its application spans a wide variety of fields. As a result, the enhancement of wireless network environments is required to realize the Ubiquitous communication.

MobileIPv6 has been standardized by IETF (Internet Engineering Task Force) as a communication protocol for wireless networks. It is regarded as an important component of the infrastructure that will realize ubiquitous communication. Moreover, for the speedy adoption of MobileIPv6 protocol, an efficient and reliable management framework is necessary.

In current Internet environments, SNMP is employed as a standard protocol for network management. An SNMP network management system comprises of a Manager system (Manager) and one or more managed systems (Agents). A Manager manages the network configuration, traffic, fault, performance and other aspects of the network. The Agent, normally installed on the managed device, maintains configuration information, traffic information, real-time status information, event information, and other network management information in a virtual store called the MIB (Management Information Base). SNMP is the transport protocol used by a Manager to obtain management information from the Agent's MIB, The Agent services requests related to MIB data from the Manager on-demand. The Manager manages the network devices within its management domain based on the MIB data obtained from Agents.

There are mainly two ways to collect network management information in traditional wired network environments described in patent document 1 and patent document 2, respectively.

In patent document 1, when a Manager collects MIB data from an Agent, it collects only the part that has changed. This can reduce the transfer data size and the data collection time, and results in a reduction of network management traffic.

In patent document 2, an Agent measures the operational status of managed devices at regular time intervals, appends time-stamp to the measured data, and stores the data in a table. A Manager collects data from an Agent in one of two data-collection modes. In the all-data-collection mode the Manager requests for all the data in the data table. The Agent sends all the data to the Manager in this case. In the latest-data-collection mode the Manager requests for the latest data record in the table and the Agent sends the latest record in the corresponding data table to the Manager. In this approach the Manager can collect large volumes of MIB data, which may be sampled at very small intervals without shortening the polling-interval. This enables the Manager to monitor and analyze small changes in the network device.

It is Japanese Patent Laid-Open No. 2000-066978 bulletin [patent document 1]

It is Japanese Patent Laid-Open No. 2002-278854 bulletin [patent document 2]

DISCLOSURE OF THE INVENTION

Problem to be Solved by the Invention

However, in wireless network environments, a Manager and an Agent are connected wirelessly, the Agent may move away from the Manager's communication range, reboot etc. causing the connectivity to be lost. Every time connectivity is lost, the Manager is likely to fail to obtain MIB data from the Agent. Data collection for current SNMP network management is generally Manager-driven. These systems have the problem that, when the connection to an Agent has recovered, the Manager has no means of collecting the MIB data corresponding to the period of disconnection. This makes it impossible for the Manager to reliably monitor a managed device.

This invention proposes a solution to the above problem. This invention aims to provide a technique that, in wireless network environments, enables the Manager to collect network management information (MIB data in the case of SNMP based network management), which the Agent has stored during periods of disconnection, after connectivity to the Agent has recovered.

Means to Solve the Problem

To achieve the above-mentioned target, the invention according to claim 1 is a Method for seamlessly collecting information from a mobile node, which is the method where a Manager gets the information related to network devices by polling Agents in a wireless network environment, wherein the Manager is having a Procedure-1 of detecting recovery of the connectivity after the connectivity between the Manager and the Agent is lost, and a Procedure-2 of seamlessly collecting the information pertaining to the period of disconnection, which the Agent has stored, after detecting recovery of the connectivity, and detecting the reboot status of the Agent, and the above-mentioned Procedure-2 is having a mechanism of collecting the information in the presence of a time lag between the Manager and the Agent.

The invention according to claim 2 is the Method for seamlessly collecting information from a mobile node, wherein the above-mentioned Agent on the mobile node is having a Procedure of sampling the relevant probes for management information at pre-configured Collection-intervals P', appending appropriate label information to the sampled management information, and storing the labeled sampled information in a Management Information Store M2, and a Procedure of looking up the Management Information Store M2 for the label-specified data, when the Agent receives a request from the Manager to deliver the label-specified data, and returning the data to the Manager, and a Procedure of returning the message "no data" to the Manager, if the label-specified data is not found in the Management Information Store M2.

Here, it is necessary that the above-mentioned label is shared between the Manager and the Agent as the key to identify the data in a time-ordered manner, and timestamp (time information) is one example of such a label.

The invention according to claim 3 is the Method for seamlessly collecting information from a mobile node, wherein the above-mentioned Manager is having a Procedure of sending the Agent a request for a label-specified data at pre-configured Polling-intervals P and receiving either "requested data" or "no data" from the Agent in response, and a Procedure of detecting "Timeout" if the Manager does not receive any response from the Agent within a pre-configured Timeout-period T0, and a Procedure of storing "requested data" in a Network Information Store M1 if the Manager receives "requested data", and a Procedure of resending the request for the label-specified data at pre-configured Next-intervals Tn, till the Manager receives the data or the number of resends exceeds N (N is an integer greater than or equal to 0) which is configured in advance if the Manager receives a response of "no data", and a Procedure of continuing to send requests for the label-specified data at pre-configured Next-intervals Tn, till it receives the data or the number of resends exceeds N (N is an integer greater than or equal to 0) which is configured in advance, if the Manager detects "Timeout".

Here, when the Manager receives the above-mentioned "no data" response, the Manager resends the request for the label-specified data at Next-intervals Tn. As a result, the data collection will succeed even in the presence of a time lag between the Manager and the Agent. That is, even in the presence of a time lag between the Manager and the Agent, the Manager can collect information from the Agent with a minimum delay equal to the time lag.

In addition, when the Manager detects the above-mentioned "Timeout", the Manager continues to send data requests till a response is received. As a result, when the connectivity between the Manager and the Agent is lost, the Manager can detect the recovery of the connectivity quickly.

The invention according to claim 4 is a Network Management System, which is the Network Management System where a Manager gets the information related to network devices by polling Agents in a wireless network environment, wherein the Manager is having a Means-1 of detecting recovery of the connectivity after the connectivity between the Manager and the Agent is lost, and a Means-2 of seamlessly collecting the information pertaining to the period of disconnection, which the Agent has stored, after detecting recovery of the connectivity, and detecting the reboot status of the Agent, and the above-mentioned Means-2 is having a mechanism of collecting the information in the presence of a time lag between the Manager and the Agent.

The invention according to claim 5 is the Network Management System, wherein the above-mentioned Agent is having a Means of sampling the relevant probes for management information at pre-configured Collection-intervals P', appending appropriate label information to the sampled management information, and storing the labeled sampled information in a Management Information Store M2, and a Means of looking up the Management Information Store M2 for the label-specified data, when the Agent receives a request from the Manager to deliver the label-specified data, and returning the data to the Manager, and a Means of returning the message "no data" to the Manager, if the label-specified data is not found in the Management Information Store M2.

Here, it is necessary that the above-mentioned label is shared between the Manager and the Agent as the key to identify the data in a time-ordered manner, and timestamp (time information) is one example of such a label.

The invention according to claim 6 is the Network Management System, wherein the above-mentioned Manager is having a Procedure of sending the Agent a request for a label-specified data at pre-configured Polling-intervals P and receiving either "requested data" or "no data" from the Agent in response, and a Procedure of detecting "Timeout" if the Manager does not receive any response from the Agent within a pre-configured Timeout-period T0, and a Procedure of storing "requested data" in a Network Information Store M1 if the Manager receives "requested data", and a Procedure of resending the request for the label-specified data at pre-configured Next-intervals Tn, till the Manager receives the data or the number of resends exceeds N (N is an integer greater than or equal to 0) which is configured in advance if the Manager receives a response of "no data", and a Procedure of continuing to send requests for the label-specified data at pre-configured Next-intervals Tn, till it receives the data or the number of resends exceeds N (N is an integer greater than or equal to 0) which is configured in advance, if the Manager detects "Timeout".

Here, when the Manager receives the above-mentioned "no data" response, the Manager resends the request for the label-specified data at Next-intervals Tn. As a result, the data collection will succeed even in the presence of a time lag between the Manager and the Agent. That is, even in the presence of a time lag between the Manager and the Agent, the Manager can collect information from the Agent with a minimum delay equal to the time lag.

In addition, when the Manager detects the above-mentioned "Timeout", the Manager continues to send data requests till a response is received. As a result, when the connectivity between the Manager and the Agent is lost, the Manager can detect the recovery of the connectivity quickly.

The invention according to claim 7 is a SNMP Network Management System, which is the SNMP Network Management System where a SNMP Manager gets the information related to network devices by polling SNMP Agents in a wireless network environment, wherein the SNMP Manager is having a Means-1 of detecting recovery of the connectivity after the connectivity between the SNMP Manager and the SNMP Agent is lost, and a Means-2 of seamlessly collecting the information pertaining to the period of disconnection, which the SNMP Agent has stored, after detecting recovery of the connectivity, and detecting the reboot status of the SNMP Agent, and the above-mentioned Means-2 is having a mechanism of collecting the information in the presence of a time lag between the SNMP Manager and the SNMP Agent.

The invention according to claim 8 is the SNMP Network Management System, wherein the above-mentioned SNMP Agent is having a Means of sampling the relevant probes for management information at pre-configured Collection-intervals P', appending appropriate label information to the sampled management information, and storing the labeled sampled information in a Management Information Store M2, and a Means of looking up the Management Information Store M2 for the label-specified data, when the SNMP Agent receives a request from the SNMP Manager to deliver the label-specified data, and returning the data to the SNMP Manager, and a Means of returning the message "no data" to the SNMP Manager, if the label-specified data is not found in the Management Information Store M2.

Here, it is necessary that the above-mentioned label is shared between the SNMP Manager and the SNMP Agent as the key to identify the data in a time-ordered manner, and timestamp (time information) is one example of such a label.

The invention according to claim 9 is the SNMP Network Management System, wherein the above-mentioned SNMP Manager is having a Means of sending the SNMP Agent a request for a label-specified data at pre-configured Polling-intervals P and receiving either "requested data" or "no data" from the SNMP Agent in response, and a Means of detecting "Timeout" if the SNMP Manager does not receive any response from the SNMP Agent within a pre-configured Timeout-period T0, and a Means of storing "requested data" in a Network Information Store M1 if the SNMP Manager receives "requested data", and a Means of resending the request for the label-specified data at pre-configured Next-intervals Tn, till the SNMP Manager receives the data or the number of resends exceeds N (N is an integer greater than or equal to 0) which is configured in advance if the SNMP Manager receives a response of "no data", and a Means of continuing to send requests for the label-specified data at pre-configured Next-intervals Tn, till it receives the data or the number of resends exceeds N (N is an integer greater than or equal to 0) which is configured in advance, if the SNMP Manager detects "Timeout".

Here, when the SNMP Manager receives the above-mentioned "no data" response, the SNMP Manager resends the request for the label-specified data at Next-intervals Tn. As a result, the data collection will succeed even in the presence of a time lag between the SNMP Manager and the SNMP Agent. That is, even in the presence of a time lag between the SNMP Manager and the SNMP Agent, the SNMP Manager can collect information from the SNMP Agent with a minimum delay equal to the time lag.

In addition, when the SNMP Manager detects the above-mentioned "Timeout", the SNMP Manager continues to send data requests till a response is received. As a result, when the connectivity between the SNMP Manager and the SNMP Agent is lost, the SNMP Manager can detect the recovery of the connectivity quickly.

Effect of the Invention

If we use the method of this invention in a wireless network environment, even though the connectivity between an Agent on a mobile node and a Manager is lost, because the mobile node moved beyond wireless communication range or for any other reason, the Manager can seamlessly collect the network management information (MIB data in the case of SNMP-based network management) which the Agent has stored, after the connectivity between the Agent and the Manager has recovered. Further, the recovery of the information during the aforementioned period of lost connectivity enables the Manager to monitor and analyze the operational status of the managed network device.

In addition, if the connectivity between an Agent on a mobile node and a Manager is lost because the Agent crashed, the mobile node rebooted or for any other reason, the Manager can seamlessly collect network management information (MIB data in the case of SNMP-based network management) after the connectivity between the Agent and the Manager has recovered. Further, the recovery of the information during the aforementioned period of lost connectivity enables the Manager to monitor and analyze the operations of the managed network device.

EXPLANATION OF CODES USED IN THE DIAGRAMS

101 SNMP Manager
102 Polling Request Processor
103 Network Information Storage Processor
104 Network Information Store
201 SNMP Agent
202 MIB Information Store
203 Management Information Collector
204 Management Information Storage Processor
205 Polling Response Processor
206 Management Information Retriever
207 Management Information Store

BEST MODE FOR CARRYING OUT THE INVENTION

Next, for a more detailed explanation, we give a concrete example, with figures, using SNMP as the network management protocol.

Figure 1:
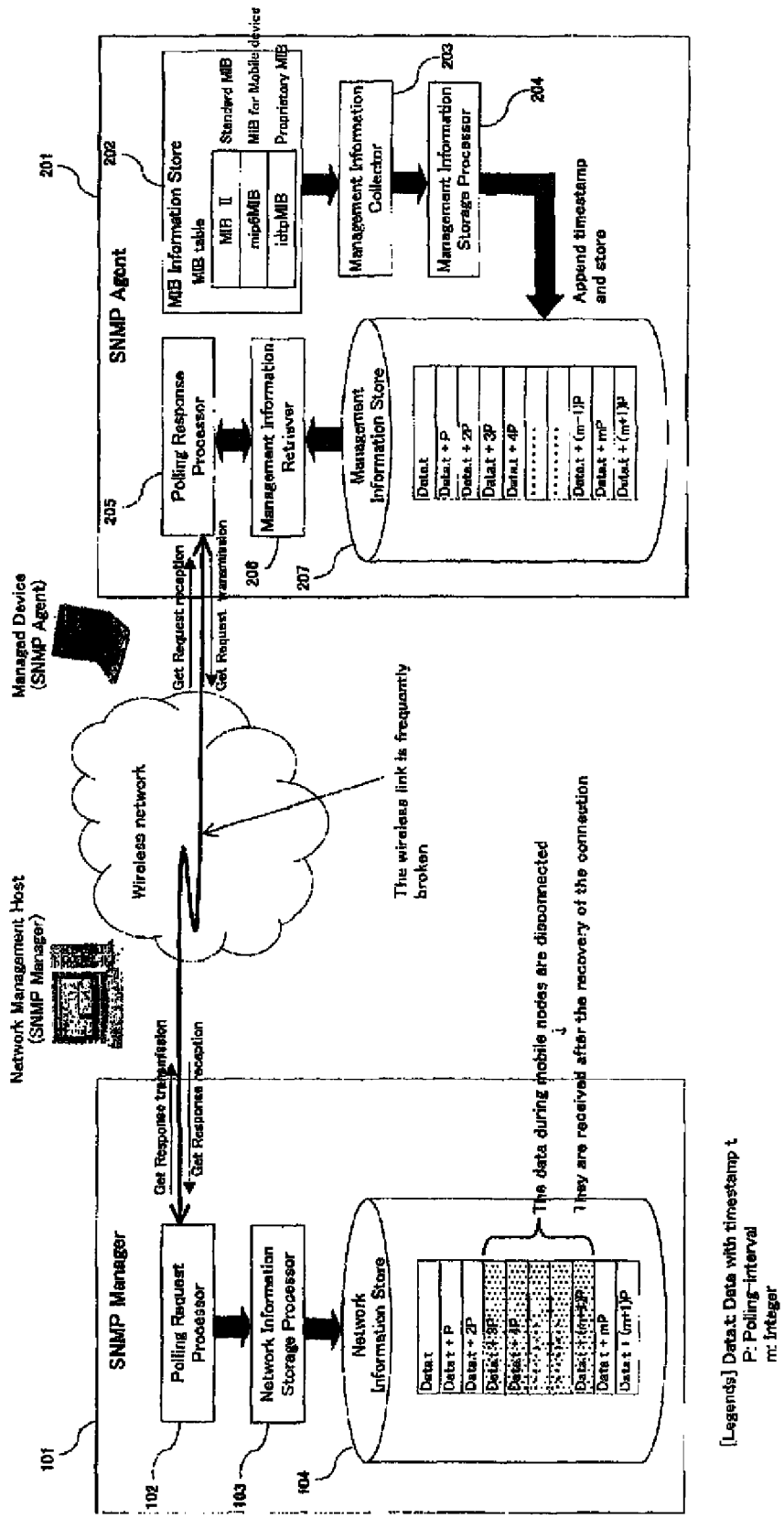
FIG. 1 is a block diagram showing the constitution of an SNMP Manager and an SNMP Agent for carrying out the claimed invention.

FIG. 1 is a block diagram showing the constitution of an SNMP Manager and an SNMP Agent for carrying out the claimed invention in SNMP network management system.

In a wireless network environment SNMP Manager 101 collects information about network devices in its management domain from SNMP Agent 201. SNMP Agent 201 maintains information about the relevant probe or network device in a local MIB 202. The Management Information Collector 203 accesses the MIB at a pre-configured Collecting-interval P', and fetches the information from the MIB 202. Management Information Storage Processor 204 appends the appropriate label information, for instance the timestamp, to the above-mentioned information read from the MIB 202, and stores it in Management Information Store 207. When Polling Response Processor 205 receives a request from SNMP Manager 101, for data labeled with timestamp t, it instructs the Management Information Retriever 206 to fetch the information with timestamp t. Management Information Retriever 206 fetches the information with timestamp t and gives it to Polling Response Processor 205. Polling Response Processor 205 transmits the data received from Management Information Retriever 206 to SNMP Manager 101.

In addition, if data with timestamp t does not exist in Management Information Store 207, Management Information Retriever 206 sends result "no data" to Polling Response Processor 205. Polling Response Processor 205 transmits the "no data" result to SNMP Manager 101.

SNMP Manager 101 also has the mechanism to collect information about network devices from SNMP Agent 201 by polling. Polling Request Processor 102 sends a data request for the data with desired timestamp t, to SNMP Agent 201 in the network at a pre-configured Polling-interval P. SNMP Agent 201 responds with either the requested data or "no data". SNMP Manager 101 has the sequence to handle both cases. In case no response is received from SNMP Agent 201 within a pre-configured Timeout-interval T0, SNMP Manager 101 detects "Timeout".

If Polling Response Processor 102 receives the requested data, it passes the data to Network Information Storage Processor 103 for storage in Network Information Store 104.

If Polling Response Processor 102 receives a response of "no data", SNMP Manager 101 resends the data request at pre-configured Next-interval, Tn, N times where N is pre-configured. The purpose behind the retrial is that, since there can be a lag between the clocks of SNMP Manager 101 and that of SNMP Agent 201 (clock of SNMP Manager 101 is faster than clock of SNMP Agent 201), SNMP Manager 101 may be able to receive the requested data by the Nth retry. Note that N is a pre-configured integer greater than or equal to 0.

If Polling Response Processor 102 detects "Timeout", that is, there is no response from SNMP Agent 201 within the pre-configured Timeout-interval T0, SNMP Manager 101 will retry. It will continue to resend the request at a pre-configured Retry-interval Tr. The purpose behind the repeated requests is that the connectivity between SNMP Manager 101 and SNMP Agent 201 is probably lost and, when the connectivity recovers, the data for the period of disconnection needs to be collected quickly and seamlessly from the SNMP Agent.

Next, we explain with reference to figures FIG. 2~FIG. 5, the sequence diagrams of an implementation of this invention and describe the detailed behavior of an SNMP Manager and an SNMP Agent.

Figure 2:
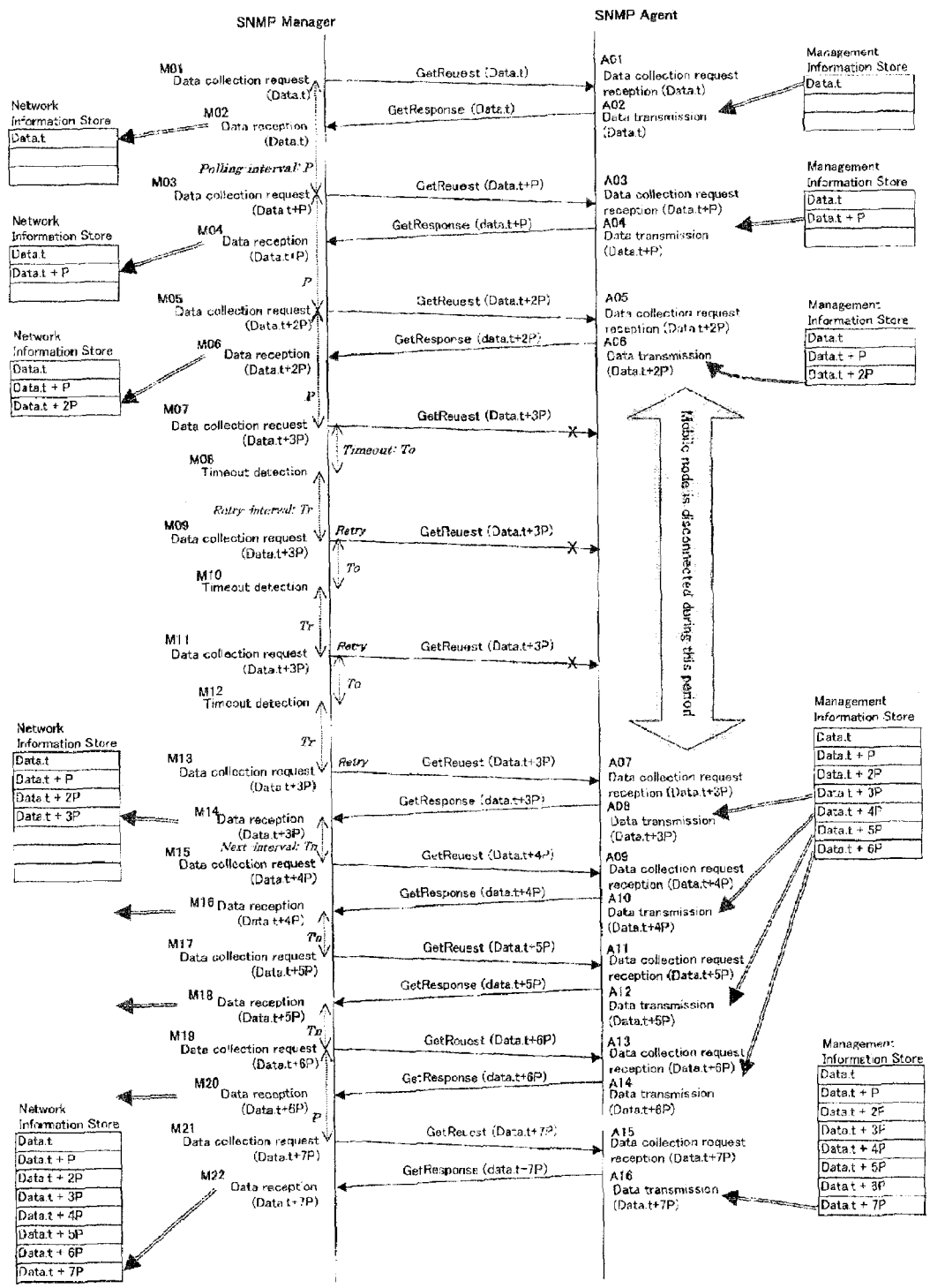
FIG. 2 is a sequence diagram of an implementation of this invention, showing the interaction of an SNMP Manager and an SNMP Agent when the connectivity between the SNMP Manager and the SNMP Agent is lost

FIG. 2 is the sequence diagram showing the behavior when the connectivity between the SNMP Manager and the SNMP Agent is lost.

To collect information of a network device by polling, the SNMP Manager sends a request GetRequest(Data.t) to the corresponding the SNMP Agent where Data.t is the Data corresponding to timestamp t (M01).

When the SNMP Agent receives request GetRequest (Data.t) (A01), it fetches Data.t from the Management Information Store and sends response GetResponse(Data.t) to the SNMP Manager containing the data (A02).

When the SNMP Manager receives response GetResponse (Data.t) (M02) containing the requested data, it stores the data in the Network Information Store.

Next, if the SNMP Manager is collecting data from the SNMP Agent at Polling-interval P, at time t+P, it sends request GetRequest(Data.t+P) for data corresponding to timestamp t+P (Data.t+P) (M03). Note that the Polling-interval P is pre-configured and can be changed to suit the management requirements.

When the SNMP Agent receives request GetRequest (Data.t+P) (A03), it fetches Data.t+P from the Management Information Store and sends response GetResponse(Data.t+ P) containing the data to the SNMP Manager (A04). When the SNMP Manager receives response GetResponse(Data.t+P) (M04) containing the requested data, it stores the data in the Network Information Store.

In a similar manner, the SNMP Manager sends request GetRequest(Data.t+2P) for data corresponding to timestamp t+2P (Data.t+2P) (M05).

When the SNMP Agent receives request GetRequest (Data.t+2P) (A05), it fetches Data.t+2P from the Management Information Store and sends response GetResponse (Data.t+2P) containing the data to the SNMP Manager (A06).

When the SNMP Manager receives response GetResponse (Data.t+2P) (M06) containing the requested data, it stores the data in the Network Information Store.

While the network state is normal and connectivity to the SNMP Agents is in place, the SNMP Manager repeats the data request to the SNMP Agent at regular Polling-intervals P (the behavior explained above).

Next, we explain the behavior when connectivity to the SNMP Agent is lost and the behavior when the connectivity is recovered.

The SNMP Manager collecting data from the SNMP Agent at Polling-interval P sends request GetRequest(Data.t+3P) for data corresponding to timestamp t+3P (Data.t+3P) (M07). Since the connectivity is lost, the SNMP Manager will not receive any response from the SNMP Agent, and thus the SNMP Manager detects "Timeout" (M08). This "Timeout" event is detected when the SNMP Manager does not receive any response from the SNMP Agent within the pre-configured Timeout-interval T0.

When the SNMP Manager detects "Timeout" (M08), it retries by resending the request GetRequest(Data.t+3P) for data corresponding to timestamp t+3P (Data.t+3P) (M09) after a Retry-interval Tr. And thus, the SNMP Manager repeats the retrial procedure after detecting "Timeout" until the connectivity to the SNMP Agent recovers and the SNMP Manager receives the response to the request GetRequest (Data.t+3 P).

In FIG. 2, the SNMP Manager receives the response GetResponse(Data.t+3P) (M14) containing the requested data after 3 retries when the connectivity to the SNMP Agent recovered. The SNMP Manager stores the above-mentioned data in the Network Information Store. Moreover, to collect the data pertaining to the period of disconnection, after the SNMP Manager receives GetResponse(Data.t+3P) (M14), it sends the request for next data after an interval of Next-interval Tn. In the example shown in FIG. 2, to collect the data pertaining to the period of disconnection, Data.t+4P, Data.t+ 5P and Data.t+6P, the SNMP Manager sends request GetRequest(Data.t+4P) for data Data.t+4P after a Next-interval Tn (M15).

When the SNMP Agent receives request GetRequest (Data.t+4P) (A09), it fetches Data.t+4P from the Management Information Store and sends response GetResponse (Data.t+4P) to the SNMP Manager (A10) containing the appropriate data.

When the SNMP Manager receives response GetResponse (Data.t+4P) (M16) containing the requested data, it stores the data in the Network Information Store, In a similar manner, the SNMP Manager obtains Data.t+5P and Data.t+6P.

Note that the data pertaining to the period of disconnection is labeled Data.t+4P, Data.t+5P and Data.t+6P because the time T according to the clock on the Manager has the following relation: t+6P<T<t+7P.

The above procedure enables the SNMP Manager to seamlessly collect data by collecting labeled data from the SNMP Agent. The recovery of data pertaining to periods of disconnection enables the SNMP Manager to have complete information about the devices in its management domain.

Further, after the above procedure for data recovery has been completed, the regular polling process continues. The SNMP Manager collects data from the SNMP Agents at the polling interval P.

In FIG. 2, the SNMP Manager sends request GetRequest (Data.t+7P) for data corresponding to timestamp t+7P (Data.t+7P) (M21).

When the SNMP Agent receives request GetRequest (Data.t+7P) (A15), it fetches Data.t+7P from the Management Information Store and sends response GetResponse (Data.t+7P) containing the appropriate data to the SNMP Manager (A16).

When the SNMP Manager receives response GetResponse (Data.t+7P) (M22) containing the appropriate data, it stores the data in the Network Information Store.

Figure 3:
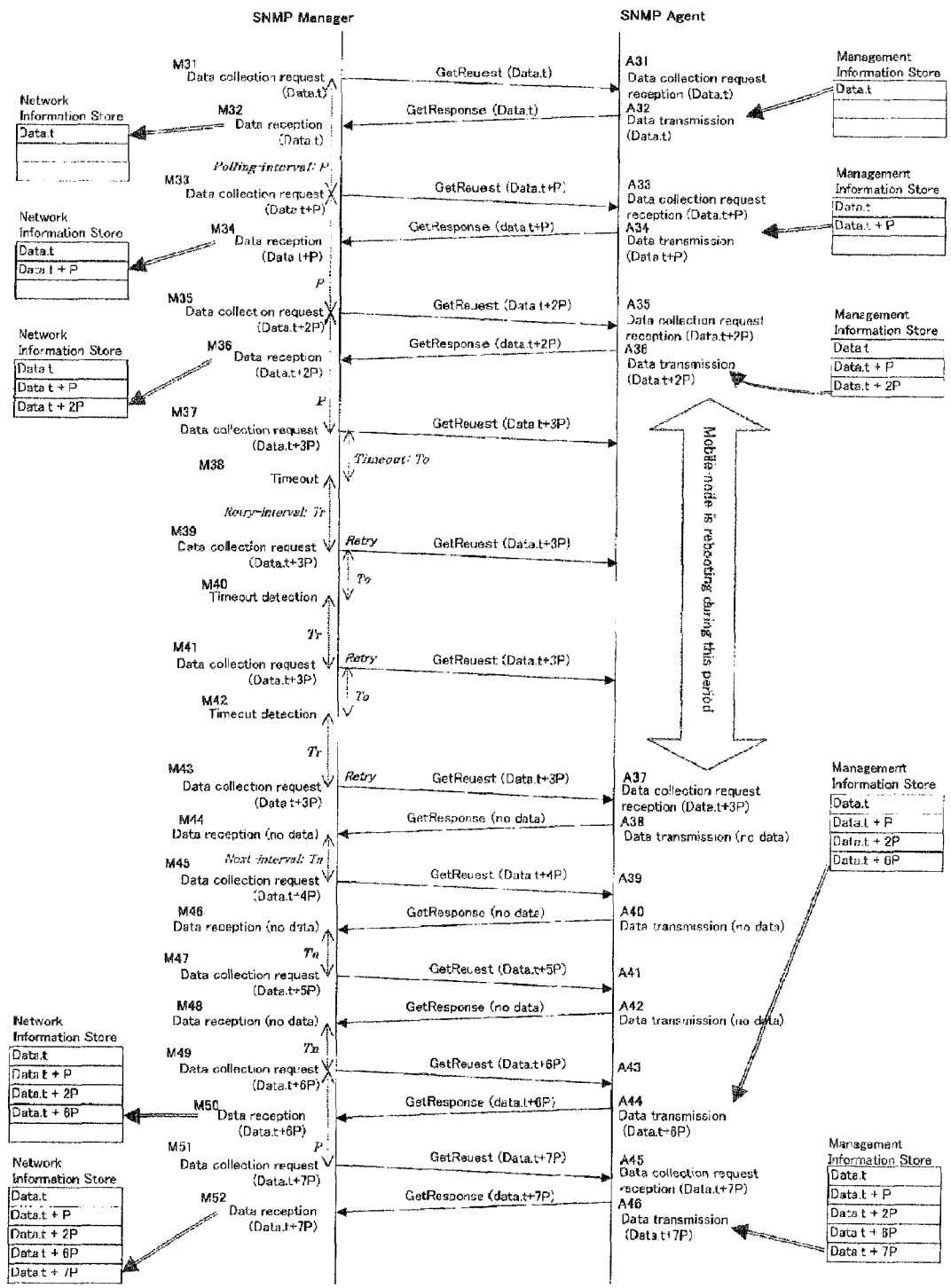
FIG. 3 is a sequence diagram of an implementation of this invention, showing the interaction of an SNMP Manager and an SNMP Agent when the SNMP Agent has rebooted

Next, FIG. 3 is the sequence diagram showing the behavior of a SNMP Manager and a SNMP Agent when the SNMP Agent has rebooted.

While the network state is normal and connectivity to the SNMP Agents is in place, SNMP Manager repeats the process to collect data from the SNMP Agents at Polling-interval P (M31-M36).

SNMP Manager sends request GetRequest(Data.t+3P) for data corresponding to timestamp t+3P (Data.t+3P) (M37). Since the SNMP Agent is rebooting, the SNMP Manager will not receive any response from the SNMP Agent, and thus detects "Timeout" (M38). This "Timeout" event is detected when the SNMP Manager does not receive response from the SNMP Agent within the pre-configured Timeout-interval T0.

When the SNMP Manager detects "Timeout" (M38), it retries by resending the request GetRequest(Data.t+3P) for data corresponding to timestamp t+3P (Data.t+3P) (M39) after a retrial-interval Tr. And thus, the SNMP Manager repeats the retrial procedure after detecting "Timeout" until the SNMP Agent's state changes from the state of rebooting into the state of running, and the SNMP Manager receives the response to its request GetRequest(Data.t+3P).

In FIG. 3, the SNMP Manager receives response GetResponse("no data") (M44) containing the requested data after 3 retries when the SNMP Agent's state changes from the state of rebooting into the state of running. This "no data" means that there is no data corresponding to timestamp t+3P in the Management Information Store because the SNMP Agent could not collect data from the corresponding MIB during the period of reboot.

Moreover, to collect the data pertaining to the period of reboot, after the SNMP Manager receives response GetResponse("no data") (M44), after Next-interval Tn the SNMP Manager sends the request for the next data. In the example shown in FIG. 3, to collect the data pertaining to the period of reboot, the SNMP Manager sends request GetRequest (Data.t+4P) for data Data.t+4P after Next-interval Tn (M45).

When the SNMP Agent receives request GetRequest (Data.t+4P) (A39), it attempts to fetch Data.t+4P from the Management Information Store but fails since data for that timestamp could not be sampled and stored due to the reboot. The SNMP Agent sends response GetResponse("no data") to the SNMP Manager (A40).

In a similar manner, the SNMP Manager sends request GetRequest(Data.t+5P) for Data.t+5P after an interval of next-interval Tn, and receives a response of GetResponse("no data") again because the SNMP Agent does not have Data.t+5P (M48).

Next, the SNMP Manager sends the request for the next data Data.t+6P after an interval of next-interval Tn, and this time receives response GetResponse(Data.t+6P) (M50) containing the appropriate data from the SNMP Agent, it stores the data in the Network Information Store.

The above procedure enables the SNMP Manager to seamlessly collect data by collecting information (collected from MIB) after the SNMP Agent's state changes from the state of rebooting into the state of running. The collection of information after the connectivity to SNMP Agent is restored enables the SNMP Manager to detect events like Agent's reboot.

Additionally, after the above procedure about data recovery has been completed, the regular process of data collection by the SNMP Manager from the SNMP Agent at Polling-interval P continues In FIG. 3, the SNMP Manager sends request GetRequest (Data.t+7P) data corresponding to timestamp t+7P (Data.t+7P) (M51).

When the SNMP Agent receives request GetRequest (Data.t+7P) (A45), it fetches Data.t+7P from the Management Information Store and sends response GetResponse (Data.t+7P) containing the data to the SNMP Manager (A46).

When the SNMP Manager receives response GetResponse (Data.t+7P) (M52) containing the requested data, it stores the data in the Network Information Store.

Figure 4:
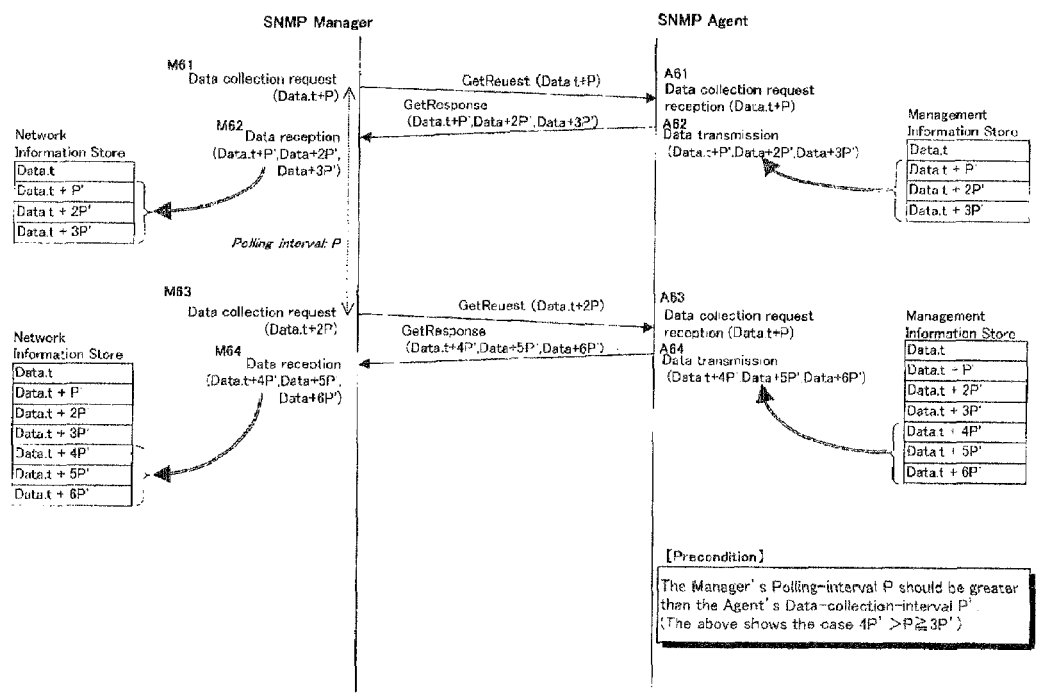
FIG. 4 is a sequence diagram of an implementation of this invention, showing the interaction of an SNMP Manager and an SNMP Agent when the Polling-interval of the SNMP Manager, P, is greater than the sampling-interval of the SNMP Agent, P'. (4P'>P≧3P').

FIG. 4 is the sequence diagram when the Polling-interval of the SNMP Manager, P, is greater than the Collecting-interval of the SNMP Agent, P'. (4P'>P≧3P')

The SNMP Manager collecting data from the SNMP Agent at Polling-interval P sends request GetRequest(Data.t+P) for data corresponding to timestamp t+P (Data.t+P) (M61).

When the SNMP Agent receives request GetRequest (Data.t+P) (A61), it fetches Data.t+P from the Management Information Store. Because the Polling-interval of the SNMP Manager, P, and the Collecting-interval of the SNMP Agent, P' have the relation 4P'>P≧3P', data (Data.t+P', Data.t+2P', Data.t+3P') exists in the Management Information Store. This data is collected by the SNMP Agent from the corresponding MIB at the pre-configured Collection-interval P' and stored in the local Management Information store after appending the timestamp. The SNMP Agent fetches data Data.t+P', Data.t+2P', Data.t+3P', and returns response GetResponse(Data.t+P', Data.t+2P', Data.t+3P') to the SNMP Manager (A62).

When the SNMP Manager receives response GetResponse (Data.t+P', Data.t+2P', Data.t+3P') (M62), it stores the data in the Network Information Store.

As described above, if the Polling-interval P, of SNMP Manager, is different from the Collecting-interval P' of the SNMP Agent, (P>P'), when the SNMP Agent receives GetRequest(Data.t+P) from the SNMP Manager, it fetches data corresponding to time T (t<T≦t+P) and returns the data to the SNMP Manager.

This enables the SNMP Manager to seamlessly collect network information from the SNMP Agent, even though the Polling-interval P, of SNMP Manager, is different from the Collecting-interval P' of SNMP Agent (P>P').

Next, in the example of FIG. 4, the SNMP Manager sends request GetRequest(Data.t+2P) for data corresponding to timestamp 2t+P (Data.t+2P) (M63).

When the SNMP Agent receives GetRequest(Data.t+2P) (A63), it fetches data (Data.t+4P', Data.t+5P', Data.t+6P') for all times T where (t+P<T≦t+2P) in the Management Information Store, and returns response GetResponse(Data.t+4P', Data.t+5P', Data.t+6P') containing the data to the SNMP Manager (A64).

When the SNMP Manager receives response GetResponse (Data.t+4P', Data.t+5P', Data.t+6P') (M64), it stores the data in the Network Information Store.

Figure 5:
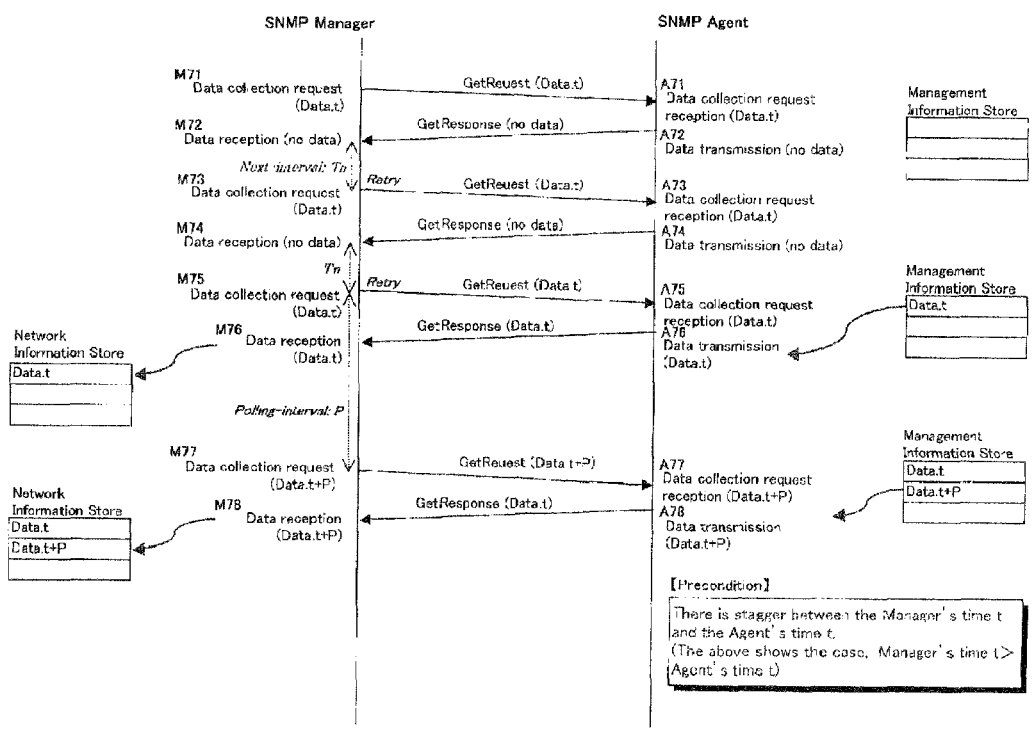
FIG. 5 is the sequence diagram of an implementation of this invention, showing the interaction of an SNMP Manager and an SNMP Agent when the Polling-interval of the SNMP Manager, P, is greater than the sampling-interval of the SNMP Agent, P'. (4P'>P≧3P').

FIG. 5 is the sequence diagram when the time by the clock of the SNMP Manager and the time by the clock of the SNMP Agent have a lag (when the time at the SNMP Manager is greater than that at the SNMP Agent).

To collect information of a network device by polling, the SNMP Manager sends request GetRequest(Data.t) to the corresponding SNMP Agent where Data.t is the Data with timestamp t (M71).

When the SNMP Agent receives request GetRequest (Data.t+P) (A71), it attempts to fetch Data.t+P from the Management Information Store. However, if the time t of the SNMP Manager is greater than that at the SNMP Agent, the data (Data.t) may not exist in the Management Information Store. In this case, SNMP Agent sends response GetResponse ("no data") to the SNMP Manager (A72).

When the SNMP Manager receives response GetResponse ("no data") (M72), it retries after Next-interval Tn by resending request GetRequest(Data.t) to the SNMP Agent (M73). This retrial is repeated by a pre-configured N number of times. Note that N is pre-configured and can be changed to suit the management requirements. If the time t on the SNMP Manager is greater than that on the SNMP Agent, the SNMP Manager will be able to receive the data with timestamp t (Data.t) by this procedure.

In FIG. 5, the SNMP Manager retries twice, when the SNMP Manager sends the second GetRequest(Data.t) to the SNMP Agent (M75), the SNMP Agent receives request GetRequest(Data.t) (A75). At this time, since data for time t (Data.t) has been collected in the Management Information Store, the SNMP Agent succeeds in fetching Data.t from Management Information Store. It sends response GetResponse(Data.t) to the SNMP Manager containing the data (A76).

When the SNMP Manager receives response GetResponse (Data.t) (M76), it stores the data in the Network Information Store.

As described above, if the SNMP Manager receives response GetResponse("no data"), it retries by resending the data request N times, where N is pre-configured.

The above procedure enables the SNMP Manager to seamlessly collect network information (collected from MIB), even though the time t of the SNMP Manager and that of the SNMP Agent have a lag (when the time on SNMP Manager is greater than that on SNMP Agent).

Figure 6:
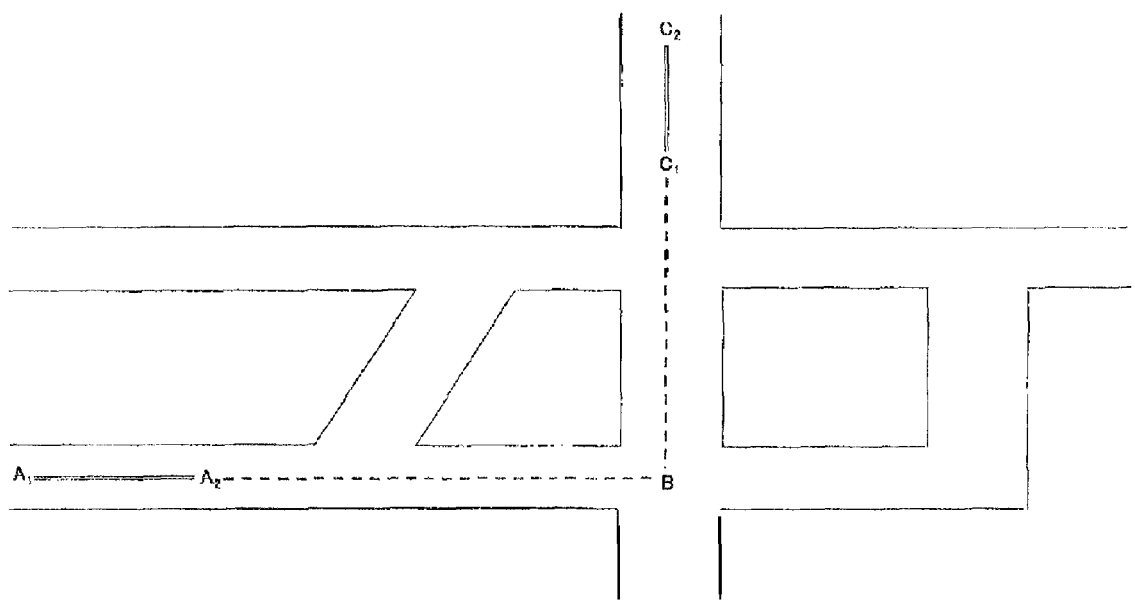
FIG. 6 is an example of an implementation of this invention, where the location of a vehicle is monitored by collecting information from an SNMP Agent in the vehicle using the wireless mode.

Next, FIG. 6 depicts the case when we monitor a vehicle's location by polling an SNMP Agent on the vehicle for the vehicle's location.

The computer on the vehicle has a Global Positioning System (GPS) device, which can tell the location of the vehicle. An SNMP Agent on a computer in the vehicle samples the GPS device at regular interval to update its Management Information Store with the time-stamped information about the vehicle's location, which is served by a GPS-MIB. By polling the SNMP Agent for the GPS-MIB data an application can monitor the movement of the vehicle.

The application polls SNMP Agent on the vehicle for the GPS-MIB data continuously and thereby tracks the path of the vehicle, in real-time, as it moves from point A1 to C2.

The vehicle goes from point A2 to point C1 via point B. If connectivity is lost while traveling from point A2 to point C1 via point B, by traditional means, the vehicle's path from A2 to C1 cannot be traced correctly. However, using the method of this invention the path from A2 to C1 can be traced because when the connectivity is restored at C1, the data collection resumes and the GPS-MIB data during the period of disconnection is collected.

In this manner the application can correctly track the path of the vehicle, in near real-time, from point A1 to point C2.

As described above, in wireless network environments, even though connectivity maybe lost, the SNMP Manager can seamlessly collect data from the SNMP Agent by polling the SNMP Agent for time-labeled data and thereby accurately and continuously track the path of a moving vehicle.

INDUSTRIAL APPLICABILITY

In recent years, rapid developments are taking place in wireless networking. Ubiquitous communication is now a close reality. This invention provides a technique that, in wireless network environments, allows a Manager to seamlessly collect network information from an Agent even if connectivity to the Agent is occasionally lost. In wireless network environments the connectivity to Agents is often lost because the corresponding mobile node has moved outside wireless communication range, rebooted or for some other reason. Under such circumstances the Manager can continuously monitor and manage network devices by seamlessly collecting information from the Agents using the methods of this invention.

What is claimed is:

1. A method for seamlessly collecting information from a mobile node in wireless network environment, in which a Manager gets the information related to network devices by polling Agents comprising:

seamlessly collecting the information, which the Agent has stored during the period of the disconnection between the Manager and the Agent, by sending the Agent a request for a label-specified data pertaining to the period of the disconnection when detecting recovery of the connectivity after the connectivity between the Manager and the Agent is lost, and judging the reboot status of the Agent when detecting discontinuous data in the information collected from the Agent; and seamlessly collecting the information at a minimum time lag, when a time lag between the Manager and the Agent occurs, by continuing to resend requests for the label-specified data at pre-configured intervals Tn upon the Manager receiving a response of "no data".

2. The method according to claim 1, further comprising in the Agent the steps of:

sampling the relevant probes for management information at pre-configured time intervals P', appending appropriate label information to the sampled management information, and storing the labeled sampled information in a Management Information Store M2;

looking up the Management Information Store M2 for the label-specified data when the Agent receives a request from the Manager to deliver the label-specified data, and returning the data to the Manager; and returning the message "no data" to the Manager, upon the label-specified data not being found in the Management Information Store M2.

3. The method according to claim 1, the Manager further comprises the steps of:

sending the Agent a request for a label-specified data at pre-configured Polling-intervals P and receiving either "requested data" or "no data" from the Agent in response;

detecting "Timeout" upon the Manager not receiving any response from the Agent within a pre-configured Timeout-period T0;

storing "requested data" in a Network Information Store M1 upon the Manager receiving "requested data";

resending the request for the label-specified data at pre-configured Next-intervals Tn, till the Manager receives the data or the number of resends exceeds N (N is an integer greater than or equal to 0) which is configured in advance upon the Manager receiving a response of "no data"; and continuing to send requests for the label-specified data at pre-configured Next-intervals Tn, till it receives the data or the number of resends exceeds N (N is an integer greater than or equal to 0) which is configured in advance, upon the Manager detecting "Timeout".

4. A Network Management System, comprising:
microprocessors programmed to perform as:
a Manager which gets the information related to network devices by polling Agents in wireless network environment by sending the Agent a request for a label-specified data at pre-configured Polling-intervals P and receiving the data pertaining the label-specified data from the Agent; and an Agent which samples the relevant probes for management information at pre-configured time intervals P', appends appropriate label information to the sampled management information, and stores the labeled sampled information in a Management Information Store, wherein the Manager comprises seamlessly collecting the information, which the Agent has stored during the period of the disconnection between the Manager and the Agent, by sending the Agent a request for a label-specified data pertaining to the period of the disconnection when detecting recovery of the connectivity after the connectivity between the Manager and the Agent is lost, and judging the reboot status of the Agent when detecting discontinuous data in the information collected from the Agent; and seamlessly collecting the information at a minimum time lag, when a time lag between the Manager and the Agent occurs, by continuing to resend requests for the label-specified data at pre-configured intervals Tn upon the Manager receiving a response of "no data".

5. The System according to claim 4, the Agent further comprises:

sampling the relevant probes for management information at pre-configured time intervals P', appending appropriate label information to the sampled management information, and storing the labeled sampled information in a Management Information Store M2;

looking up the Management Information Store M2 for the label-specified data when the Agent receives a request from the Manager to deliver the label-specified data, and returning the data to the Manager; and returning the message "no data" to the Manager, upon the label-specified data not being found in the Management Information Store M2.

6. The System according to claim 4, the Manager further comprises:

sending the Agent a request for a label-specified data at pre-configured Polling-intervals P and receiving either "requested data" or "no data" from the Agent in response;

detecting "Timeout" upon the Manager not receiving any response from the Agent within a pre-configured Timeout-period T0;

storing "requested data" in a Network Information Store M1 upon the Manager receiving "requested data";

resending the request for the label-specified data at pre-configured Next-intervals Tn, till the Manager receives the data or the number of resends exceeds N (N is an integer greater than or equal to 0) which is configured in advance upon the Manager receiving a response of "no data"; and continuing to send requests for the label-specified data at pre-configured Next-intervals Tn, till it receives the data or the number of resends exceeds N (N is an integer greater than or equal to 0) which is configured in advance, upon the Manager detecting "Timeout".

7. A SNMP Network Management System, comprising:
microprocessors programmed to perform as:
a SNMP Manager which gets the information related to network devices by polling SNMP Agents in wireless network environment by sending the SNMP Agent a request for a label-specified data at pre-configured Polling-intervals P and receiving the data pertaining the label-specified data from the SNMP Agent; and a SNMP Agent which samples the relevant probes for management information at pre-configured time intervals P', appends appropriate label information to the sampled management information, and stores the labeled sampled information in a Management Information Store, wherein the SNMP Manager comprises seamlessly collecting the information, which the SNMP Agent has stored during the period of the disconnection between the SNMP Manager and the SNMP Agent, by sending the SNMP Agent a request for a label-specified data pertaining to the period of the disconnection when detecting recovery of the connectivity after the connectivity between the SNMP Manager and the SNMP Agent is lost, and judging the reboot status of the SNMP Agent when detecting discontinuous data in the information collected from the SNMP Agent; and seamlessly collecting the information at a minimum time lag, when a time lag between the SNMP Manager and the SNMP Agent occurs, by continuing to resend requests for the label-specified data at pre-configured intervals Tn upon the SNMP Manager receiving a response of "no data".

8. The System according to claim 7, the SNMP Agent further comprises:

sampling the relevant probes for management information at pre-configured time intervals P', appending appropriate label information to the sampled management information, and storing the labeled sampled information in a Management Information Store M2;

looking up the Management Information Store M2 for the label-specified data when the SNMP Agent receives a request from the SNMP Manager to deliver the label-specified data, and returning the data to the SNMP Manager; and returning the message "no data" to the SNMP Manager, upon the label-specified data not being found in the Management Information Store M2.

9. The System according to claim 7, the SNMP Manager further comprises:

sending the SNMP Agent a request for a label-specified data at pre-configured Polling-intervals P and receiving either "requested data" or "no data" from the SNMP Agent in response;

detecting "Timeout" upon the SNMP Manager not receiving any response from the SNMP Agent within a pre-configured Timeout-period T0;

storing "requested data" in a Network Information Store M1 upon the Manager receiving "requested data";

resending the request for the label-specified data at pre-configured Next-intervals Tn, till the SNMP Manager receives the data or the number of resends exceeds N (N is an integer greater than or equal to 0) which is configured in advance upon the SNMP Manager receiving a response of "no data"; and continuing to send requests for the label-specified data at pre-configured Next-intervals Tn, till it receives the data or the number of resends exceeds N (N is an integer greater than or equal to 0) which is configured in advance, upon the SNMP Manager detecting "Timeout".

* * * * *